(12) United States Patent
Heng-I et al.

(10) Patent No.: US 7,071,590 B2
(45) Date of Patent: Jul. 4, 2006

(54) COAXIAL DYNAMICAL SYSTEM

(75) Inventors: Lin Heng-I, Taipei Hsien (TW); Chuang Feng-Ming, Taipei Hsien (TW)

(73) Assignee: Liung Feng Industrial Co., Ltd., Taipei Hsien (TW)

( * ) Notice: Subject to any disclaimer, the term of this patent is extended or adjusted under 35 U.S.C. 154(b) by 21 days.

(21) Appl. No.: 10/873,268

(22) Filed: Jun. 23, 2004

(65) Prior Publication Data

US 2005/0285466 A1 Dec. 29, 2005

(51) Int. Cl.
*F04B 17/00* (2006.01)

(52) U.S. Cl. ............... 310/104; 310/103; 417/420; 123/198 C; 74/11

(58) Field of Classification Search ............... 310/104; 123/198 C, 41.44; 417/420, 231; 74/11, 74/15.6, 15.63; 159/DIG. 7; 494/29
See application file for complete search history.

(56) References Cited

U.S. PATENT DOCUMENTS

| | | | | |
|---|---|---|---|---|
| 3,591,818 A | * | 7/1971 | Fulton | 310/104 |
| 4,184,090 A | * | 1/1980 | Taiani et al. | 310/104 |
| 4,207,485 A | * | 6/1980 | Silver | 310/104 |
| 4,896,064 A | * | 1/1990 | Taiani | 310/104 |
| 5,857,842 A | * | 1/1999 | Sheehan | 417/420 |
| 6,422,195 B1 | * | 7/2002 | Powell | 123/198 C |

FOREIGN PATENT DOCUMENTS

EP 320 061 A2 * 12/1988

* cited by examiner

*Primary Examiner*—Burton Mullins
(74) *Attorney, Agent, or Firm*—Troxell Law Office, PLLC

(57) ABSTRACT

A coaxial dynamical system includes a motor having a transmission shaft, a dynamical transmission member rotatably connecting to the transmission shaft, and a magnetic driving mechanism connected between the transmission shaft and the dynamical transmission member. The magnetic driving mechanism includes a sleeve assembly, a sleeve fixing member, a magnetic coupler and a magnetic driver. The magnetic coupler has a first multi-pole magnet and is positioned next to the transmission shaft. The magnetic driver is fixed to the transmission shaft corresponding to the magnetic coupler and has a second multi-pole magnet with an opposite polarity relative to the first multi-pole magnet of the magnetic coupler. When the dynamical transmission member is fails, the magnetic driving mechanism is prevented from adversely affecting the normal working of the transmission shaft through the magnetic driver by disconnecting from the magnetic coupler.

8 Claims, 4 Drawing Sheets

COAXIAL DYNAMICAL SYSTEM

BACKGROUND OF THE INVENTION

1. Field of the Invention

The present invention relates to a dynamical system, and particularly to a coaxial dynamical system of which a transmission shaft functions as a dynamical source to drive at least two different devices through coaxial rotation.

2. Prior Art

A transmission shaft of a motor functions to provide dynamical transmission for driving a device or a transmission mechanism connected thereto, such as a fan, a pump, a gear or an idle wheel. Therefore, the motor is widely applied in various fields.

With the purpose of enhancing heat transfer efficiency, a conventional air conditioner includes a motor for driving a fan and another motor for driving a liquid pump. However, the air conditioner having two or more motors not only occupies more assembling space but also increases fabrication cost.

Furthermore, the heat dissipation of the refrigerant condenser of the conventional air conditioner is through the fan only, which results in low efficiency. The condensing water resulted from the refrigerant evaporator of the air conditioner is directly drained away from the air conditioner, which needs not only a pipeline additionally mounted during installation of the air conditioner, but also a high-head pump additionally mounted for efficiently draining the condensing water away. Hence, it is necessary to improve the conventional air conditioner, and particularly the dynamical system of the air conditioner.

SUMMARY OF THE INVENTION

Accordingly, an object of the present invention is to provide a coaxial dynamical system having a transmission shaft which provides at least two dynamical outputs for driving plural devices thereby increasing functions of the transmission shaft and reducing assembling cost.

Another object of the present invention is to provide a coaxial dynamical system having a transmission shaft of which the normal working is not adversely affected when a driven device fails.

Another object of the present invention is to provide a coaxial dynamical system having a transmission shaft for driving a fan to rotate and driving a pump to provide a high-pressure liquid transmission for liquid atomization and uniform spraying on the outter surface of the heat exchanger, thereby increasing heat dissipation efficiency.

To achieve the above-mentioned objects, a coaxial dynamical system in accordance with the present invention includes a motor having a transmission shaft, a dynamical transmission member rotatably connecting to the transmission shaft of the motor, and a magnetic driving mechanism connected between the transmission shaft and the dynamical transmission member. The magnetic driving mechanism includes a sleeve assembled between the transmission shaft and the dynamical transmission member, a sleeve fixing member for positioning the sleeve to transmission shaft, a magnetic coupler and a magnetic driver. The magnetic coupler has a first multi-pole magnet and is positioned to the transmission shaft. The magnetic driver is fixed to the transmission shaft corresponding to the magnetic coupler and has a second multi-pole magnet with an opposite polarity relative to the first multi-pole magnet of the magnetic coupler. The transmission shaft drives a fan fixed thereto and drives a pump through the dynamical transmission member. When the dynamical transmission member fails, the magnetic driving mechanism prevents it from adversely affecting the normal working of the transmission shaft because the magnetic driver disconnects from the magnetic coupler.

Other objects, advantages and novel features of the present invention will be drawn from the following detailed embodiments of the present invention with attached drawings, in which:

DESCRIPTION OF THE PREFERRED EMBODIMENTS

Figure 1:
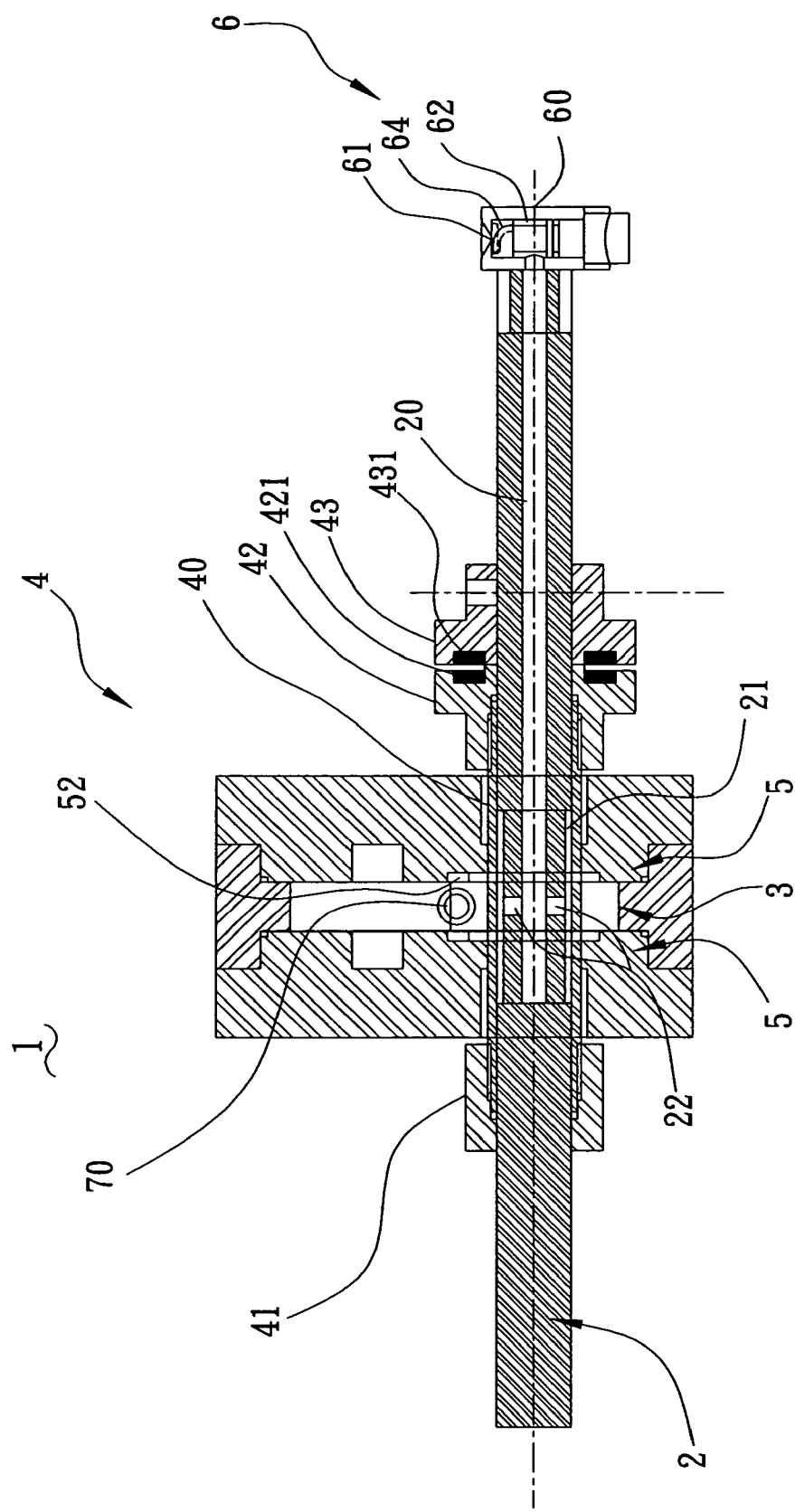
FIG. 1 is a cross-sectional view of a coaxial dynamical system of the present invention.
Figure 5:
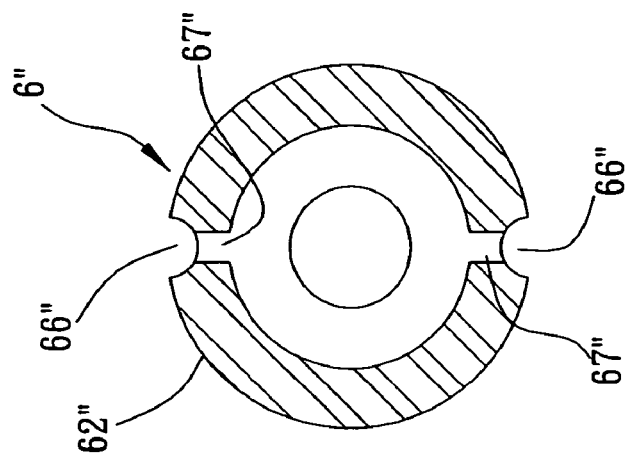
FIGS. 4 and 5 are cross-sectional views of an atomization generator of a atomizer in accordance with second and third embodiments of the present invention.
Figure 4:
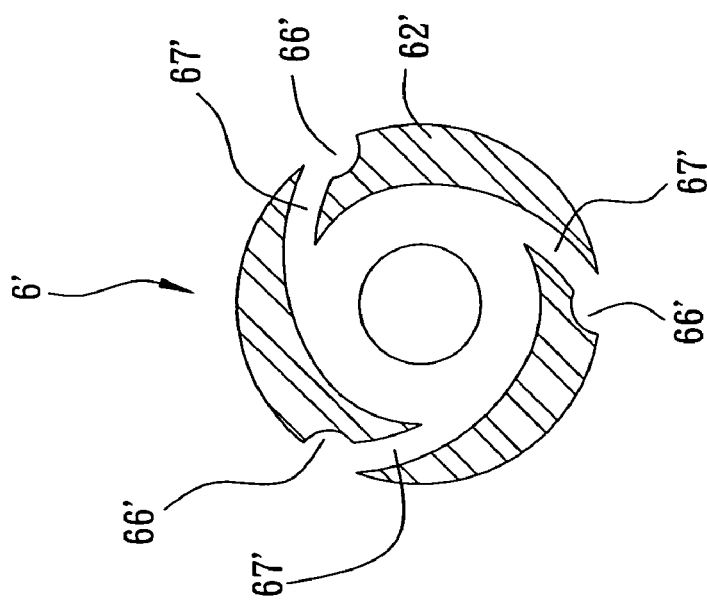
Figure 2:
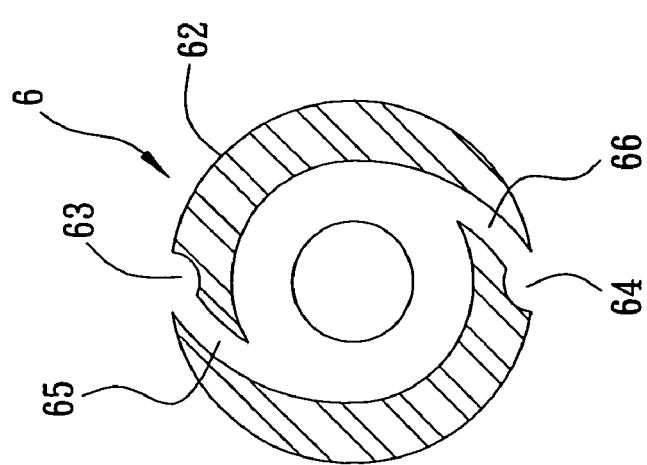
FIG. 2 is a cross-sectional view of an atomization generator of a atomizer of the present invention.

Referring to FIG. 1, a coaxial dynamical system 1 of the present invention is applied to an air conditioner. The coaxial dynamical system 1 is assembled in the air conditioner to drive a fan fixed thereto, and to implement condensing water drainage and water spraying on condenser for enhancing heat dissipation and includes a motor (not shown) having a transmission shaft 2, a dynamical transmission member 3, a magnetic driving mechanism 4, a pair of water guiding bushings 5, and a atomizer 6. A fan (not shown) is attached to the transmission shaft 2 close to the atomizer 6. A liquid flowing passage 20 is defined in an axes of the transmission shaft 2. Liquid is driven to flow along the liquid flowing passage 20 during rotation of the transmission shaft 2 thereby forming a high-pressure liquid transmission path. Furthermore, the atomizer 6 is disposed at an end of the liquid flowing passage 20 of the transmission shaft 2. Referring to FIG. 2, the atomizer 6 includes a hollow body 60 with a nozzle 61 formed thereat. An atomization generator 62 is inserted into the hollow body 60. A pair of water guiding openings 63, 64 is symmetrically defined in the atomization generator 62. A pair of arcuate through grooves 65, 66 is symmetrically defined in the atomization generator 62 respectively in communication with the water guiding openings 63, 64 thereby forming arcuate flowing paths. Thus, the liquid flowed into the water guiding openings 63, 64 is guided by the arcuate through grooves 65, 66 to form a swirl vortex and then sprayed through the nozzle 61. At the same time, with the aid of fan blowing could make the sprayed liquid more uniform. An annular recess 21 is defined in the transmission shaft 2. A plurality of water guiding holes 22 is defined in the transmission shaft 2 and in communication with the annular recess 21. Referring to FIGS. 4 and 5, the atomization generator 62', 62" of the sprayer 6', 6" may be embodied in different forms. Referring to FIG. 4, three water guiding openings 66' and three arcuate through grooves 67' are evenly defined around the atomization generator 62' thereby facilitating to form a strong swirl vortex of the liquid. Referring to FIG. 5, a pair of water guiding openings 66" and a pair of vertical arcuate through grooves 67" are defined in the atomization generator 62" thereby forming a collision of the liquid for achieving liquid atomization.

The dynamical transmission member 3 is a gear which is rotatably connected to the transmission shaft 2 and drives a pump (not shown) of the air conditioner thereby facilitating to increase heat dissipation efficiency of the refrigerant condensation system.

Figure 3:
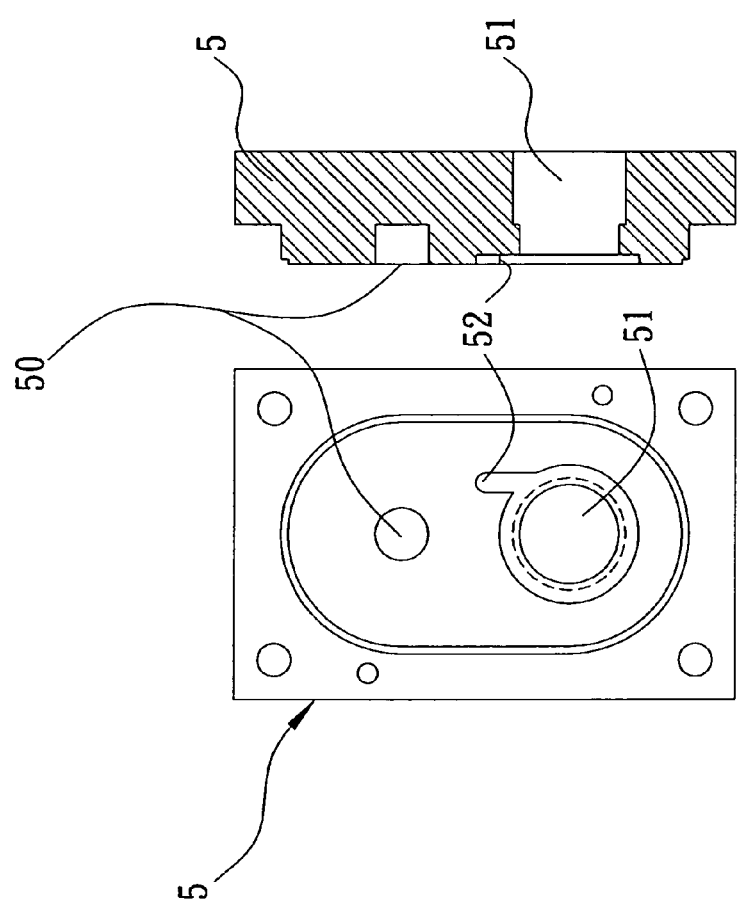
FIG. 3 is a cross-sectional view of a water guiding bushing of the present invention, and a left side elevational view thereof.

Referring to FIG. 3, the water guiding bushings 5 are attached to opposite sides of the dynamical transmission member 3. A first connection hole 50 and a second connection hole 51 are defined in each of the water guiding bushings 5. The second connection hole 51 is rotatably connected to the transmission shaft 2. An annular flow guiding chamber 52 is defined in each of the water guiding bushings 5 and in communication with the second connection hole 51, a liquid inlet hole 70 of the pump and the transmission shaft 2 (see FIG. 1). Thus, the liquid from the liquid inlet hole 70 of the pump can flow into the annular flow guiding chamber 52, then pass through the annular recess 21 and the water guiding holes 22 of the transmission shaft 2, and then flow into the liquid flowing passage 20.

The magnetic driving mechanism 4 is connected between the transmission shaft 2 and the dynamical transmission member 3 and includes a sleeve 40, a sleeve fixing member 41, a magnetic coupler 24 and a magnetic driver 43. The sleeve 40 is assembled to the transmission shaft 2 surrounding the annular recess 21 and extending through the second connection holes 51 of the water guiding bushings 5. The sleeve fixing member 41 is attached to one end fo the sleeve 40 and positions the sleeve 40 to the transmission shaft 2. The magnetic coupler 42 is attached to the other end of the sleeve 40 and positions the sleeve 40 on the transmission shaft 2. The magnetic coupler 42 has a first multi-pole magnet 421. The magnetic driver 43 is fixed to the transmission shaft 2 corresponding to the magnetic coupler 42 and has a second multi-pole magnet 431 with an opposite polarity relative to the first multi-pole magnet 421. Due to the principle of attraction between different polarities of magnets, the magnetic driver 43 and the magnetic coupler 42 are attractively connected together with a magnetic force. Thus, when the magnetic driver 43 rotates with the transmission shaft 2, the magnetic driver 43 drives the magnetic coupler 42 to rotate together through the torque induced by magnetic force. When the magnetic coupler 42 needs a larger torque than that could be induced by the magnetic force, the magnetic driver 43 will fail to drive magnetic coupler 42 but keep itself rotating normally. Therefore, when the dynamical transmission member 3 fails, the magnetic driver 43 will be disconnected from the magnetic coupler 42 and keeps rotating with the transmission shaft 2 thereby preventing it from adversely affecting the normal working of the transmission shaft 2.

As mentioned above, rotation of the transmission shaft 2 can cause not only rotation of the fan of the air conditioner, but also rotation of the dynamical transmission member 3 which drives a pump thereby increasing heat dissipation efficiency of the refrigerant condensation system. Meanwhile, when the dynamical transmission member 3 fails, the magnetic driving mechanism 4 maintains the normal working of the transmission shaft 2 through the magnetic driver 43 disconnecting from the magnetic coupler 42.

Figure 6:
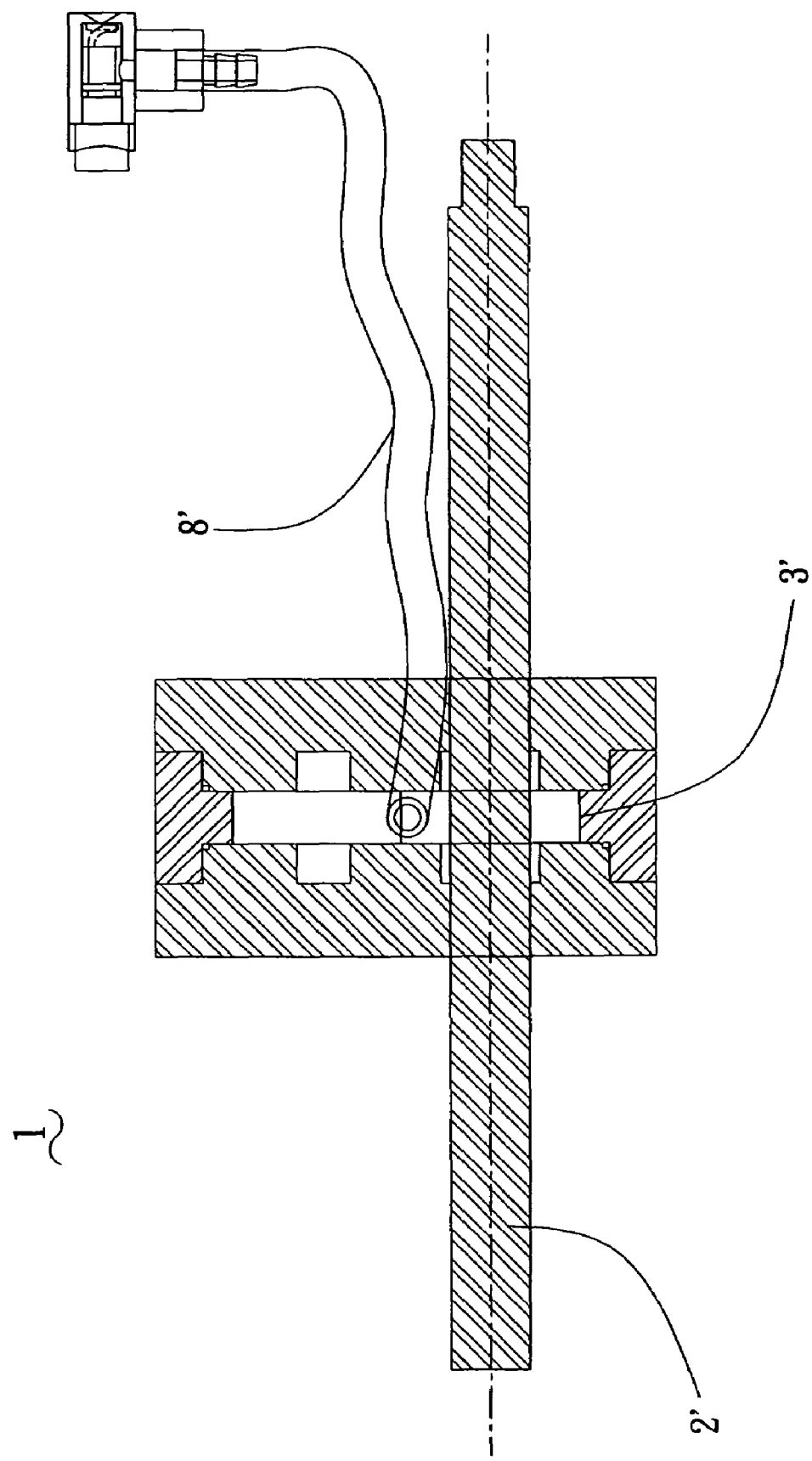
FIG. 6 is a cross-sectional view of a coaxial dynamical system in accordance with a second embodiment of the present invention.

Referring to FIG. 6, a coaxial dynamical system 1' in accordance with a second embodiment of the present invention is shown. The coaxial dynamical system 1' has a transmission shaft 2' and a dynamical transmission member 3' directly fixed to the transmission shaft 2'. A drainpipe 8' is used to transmit liquid compressed by a pump (not shown) to a atomizer.

The coaxial dynamical system of the present invention may be applied to a car for rotating a rain brush and sprinkling, or a headlight for cleaning, or a gardening irrigation apparatus for rotating and sprinkling, besides an air conditioner in the above embodiments.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A coaxial dynamical system, assembled to an air conditioner for driving a fan and implementing condensing water drainage and condenser spray for heat dissipation, the coaxial dynamical system comprising:
    a motor, having a transmission shaft connecting to the fan, a liquid flowing passage defined in an axis of the transmission shaft with an atomizer disposed at an end thereof;
    a dynamical transmission member, rotatably connecting with the transmission shaft of the motor for driving a pump of the air conditioner; and
    a magnetic driving mechanism, connected between the transmission shaft of the motor and the dynamical transmission member, the magnetic driving mechanism comprising;
        a sleeve, assembled between the transmission shaft and the dynamical transmission member;
        a sleeve fixing member, positioning the sleeve to the transmission shaft;
        a magnetic coupler, having a first multi-pole magnet and positioned to the transmission shaft; and
        a magnetic driver, fixed to the transmission shaft corresponding to the magnetic coupler, the magnetic driver having a second multi-pole magnet with an opposite polarity relative to the magnetic coupler; whereby the transmission shaft drives the fan and drives the pump through the dynamical transmission member, and when the dynamical transmission member fails, the magnetic driver is disconnected from the magnetic coupler preventing the magnetic driving mechanism from adversely affecting a normal operation of the transmission shaft.

2. The coaxial dynamical system as claimed in claim 1, further comprising a pair of water guiding bushings attached to opposite sides of the dynamical transmission member, a first connection hole and a second connection hole being defined in each of the water guiding bushings, and an annular flow guiding chamber defined in the water guiding bushing and in communication with the second connection hole, a liquid inlet hole defined in the pump and the transmission shaft.

3. The coaxial dynamical system as claimed in claim 2, wherein an annular recess is defined in the transmission shaft corresponding to the annular flow guiding chamber of the water guiding bushing, and at least one water guiding hole is defined in the transmission shaft and in communication with the annular recess and the liquid flowing passage.

4. The coaxial dynamical system as claimed in claim 3, wherein the dynamical transmission member is a gear for driving the pump.

5. The coaxial dynamical system as claimed in claim 4, further comprising an atomizer, wherein the atomizer has a hollow body with a nozzle, an atomization generator is inserted into the hollow body, at least two water guiding openings are symmetrically defined in the atomization generator in communication with the liquid flowing passage of the transmission shaft whereby the liquid flows through the liquid flowing passage to the hollow body and then swirls and collides to spray through the nozzle thereby atomizing the liquid.

6. The coaxial dynamical system as claimed in claim 5, wherein at least two arcuate through grooves are defined in the atomization generator and are respectively in communication with the at least two water guiding openings for forming arcuate flowing paths whereby the liquid flows into the hollow body forming a swirly collision and then is atomized.

7. A coaxial dynamical system, comprising:
a motor, having a transmission shaft;

a dynamical transmission member, rotatably connecting to the transmission shaft of the motor; and a magnetic driving mechanism, connected between the transmission shaft and the dynamical transmission member, the magnetic driving mechanism comprising:

a sleeve, assembled between the transmission shaft and the dynamical transmission member;

a sleeve fixing member connected to a first end of the sleeve and positioning the sleeve on the transmission shaft;

a magnetic coupler having a first multi-pole magnet, and connected to a second end of the sleeve and positioning the sleeve on the transmission shaft; and a magnetic driver fixed on the transmission shaft adjacent to the magnetic coupler, and having a second multi-pole magnet with an opposite polarity relative to the first multi-pole magnet of the magnetic coupler, wherein a liquid flowing passage is defined in an axis of the transmission shaft for forming a high-pressure liquid transmission path during rotation of the transmission shaft, wherein the dynamical transmission member is a gear for driving a pump, and further comprising an atomizer disposed at an end of the liquid flowing passage of the transmission shaft of the motor, the atomizer comprising a hollow body with a nozzle, an atomization generator inserted into the hollow body, at least two water guiding openings being symmetrically defined in the atomization generator in communication with the liquid flowing passage of the transmission shaft whereby the liquid flows through the liquid flowing passage to the hollow body and then swirls and collides to spray through the nozzle thereby atomizing the liquid.

8. The coaxial dynamical system as claimed in claim 7, wherein at least two arcuate through grooves are defined in the atomization generator and are respectively in communication with the at least two water guiding openings for forming arcuate flowing paths whereby the liquid flowing into the hollow body forms a swirly collision and then is atomized.

* * * * *